US010257808B2

(12) United States Patent
Xia et al.

(10) Patent No.: US 10,257,808 B2
(45) Date of Patent: *Apr. 9, 2019

(54) PREAMBLE SEQUENCE TRANSMISSION METHOD, APPARATUS, AND SYSTEM

(71) Applicant: Huawei Technologies Co., Ltd., Shenzhen (CN)

(72) Inventors: Jinhuan Xia, Beijing (CN); Yongxia Lyu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/712,792

(22) Filed: Sep. 22, 2017

(65) Prior Publication Data

US 2018/0014279 A1 Jan. 11, 2018

Related U.S. Application Data

(63) Continuation of application No. 14/793,472, filed on Jul. 7, 2015, now Pat. No. 9,788,304, which is a (Continued)

(30) Foreign Application Priority Data

Jan. 7, 2013 (CN) .......................... 2013 1 0005017

(51) Int. Cl.
*H04W 48/12* (2009.01)
*H04W 72/00* (2009.01)
*H04W 74/08* (2009.01)

(52) U.S. Cl.
CPC ..... *H04W 72/005* (2013.01); *H04W 74/0833* (2013.01); *H04W 48/12* (2013.01)

(58) Field of Classification Search
CPC .... H04W 74/004; H04W 74/0086; H04L 1/08
(Continued)

(56) References Cited

U.S. PATENT DOCUMENTS 8,295,266 B2   10/2012  Kwon et al.
9,820,244 B2*  11/2017  Earnshaw ........... H04W 56/001
(Continued)

FOREIGN PATENT DOCUMENTS

CN   101035103 A   9/2007
CN   101569231 A   10/2009
(Continued)

OTHER PUBLICATIONS

Nokia Siemens Networks et al., "Coverage Improvement for MTC UEs," 3GPP TSG RAN1#71, R1-125018, New Orleans, LA, USA, Nov. 12-16, 2012, 4 pages.
(Continued)

Primary Examiner — Melanie Jagannathan
(74) Attorney, Agent, or Firm — Slater Matsil, LLP

(57) ABSTRACT

Embodiments of the present invention provide a preamble sequence transmission method, apparatus, and system. The method includes: acquiring system information or a physical broadcast channel (PBCH) that is broadcast by a base station, wherein the system information or the PBCH comprises a preset physical random access channel (PRACH) that comprises m preset radio frames and a number of repetition times of a preamble sequence n, which is used for random access, m being a positive integer and wherein $1 \le n \le 10$ m; and sending the preamble sequence to the base station, the preamble sequence being sent at n preset resource locations of the preset PRACH, where the preamble sequence is the format of 1 ms, or the format of 2 ms, or the format of 3 ms.

9 Claims, 8 Drawing Sheets

Related U.S. Application Data continuation of application No. PCT/CN2014/070241, filed on Jan. 7, 2014.

(58) Field of Classification Search
USPC .............................. 370/280, 350, 455, 422.1
See application file for complete search history.

(56) References Cited

U.S. PATENT DOCUMENTS

| | | |
|---|---|---|
| 2007/0291696 A1 | 12/2007 | Zhang et al. |
| 2009/0305693 A1 | 12/2009 | Shimomura et al. |
| 2010/0246456 A1 | 9/2010 | Suo et al. |
| 2011/0013542 A1 | 1/2011 | Yu et al. |
| 2012/0099532 A1 | 4/2012 | Lee et al. |

FOREIGN PATENT DOCUMENTS

| | | |
|---|---|---|
| CN | 101809896 A | 8/2010 |
| WO | 2014055878 A1 | 4/2014 |

OTHER PUBLICATIONS

Ericsson et al., "Required Functionality for Coverage Enhancements for MTC," 3GPP TSG-RAN WG1 Meeting #71, R1-124888, New Orleans, LA, USA, Nov. 12-16, 2012, 4 pages.

3rd Generation Partnership Project; Technical Specification Group Radio Access Network; Evolved Universal Terrestrial Radio Access (E-UTRA); Physical Channels and Modulation (Release 8), 3GPP TS 36.211 V8.9.0 (Dec. 2009), 83 pages.

3rd Generation Partnership Project; Technical Specification Group Radio Access Network; Evolved Universal Terrestrial Radio Access (E-UTRA); Radio Resource Control (RRC); Protocol specification (Release 8), 3GPP TS 36.331 V8.17.0 (Jun. 2012), 215 pages.

\* cited by examiner

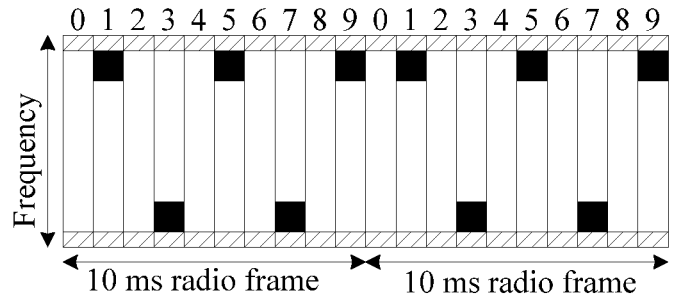

FIG. 1

```
┌─────────────────────────────────────────────┐
│  User equipment acquires system information or │
│  a physical broadcast channel PBCH that is broadcast by │
│  a base station, where the system information or the PBCH │──── S101
│    includes a preset physical random access channel │
│    PRACH, the preset PRACH includes m preset radio │
│         frames, and m is a positive integer │
└─────────────────────────────────────────────┘
                      │
                      ▼
┌─────────────────────────────────────────────┐
│    The user equipment determines that a quantity of │
│ repetition times of a preamble sequence, which is used for │──── S102
│ random access, at a preset resource location of the preset │
│         PRACH is n, where $1 \leq n \leq 10m$ │
└─────────────────────────────────────────────┘
                      │
                      ▼
┌─────────────────────────────────────────────┐
│ The user equipment sends, at n preset resource locations │──── S103
│  of the preset PRACH, the preamble sequence to the base │
│                    station │
└─────────────────────────────────────────────┘
```

FIG. 2

PREAMBLE SEQUENCE TRANSMISSION METHOD, APPARATUS, AND SYSTEM

CROSS-REFERENCE TO RELATED APPLICATIONS

This application is a continuation of U.S. patent application Ser. No. 14/793,472, filed on Jul. 7, 2015, which is a continuation of International Application No. PCT/CN2014/070241, filed on Jan. 7, 2014, which claims priority to Chinese Patent Application No. 201310005017.1, filed on Jan. 7, 2013. All of the afore-mentioned patent applications are hereby incorporated by reference in their entireties.

TECHNICAL FIELD

The present invention relates to the communications field, and in particular, to a preamble sequence transmission method, apparatus, and system.

BACKGROUND

With the continuous development and improvement of communications systems, people have increasingly high requirements on communication quality, that is, they hope to communicate well not only on the ground or in open space, but also in a relatively secluded place such as a basement.

Currently, one radio frame is composed of 10 subframes, and the 10 subframes are respectively numbered as subframe 0, subframe 1, subframe 2, . . . , and subframe 9. A 10 ms radio frame is used as an example; each subframe of the radio frame is 1 ms, and if a preamble sequence is also 1 ms, one preamble sequence may be sent within each subframe of the radio frame.

In the prior art, a process in which user equipment randomly gains access to a base station is the first step for the user equipment to implement uplink synchronization and establish a connection to the base station. In the process in which the user equipment randomly gains access to the base station, the user equipment randomly selects a preamble sequence that is from the base station and sends the preamble sequence to the base station, so that the base station sends, after correctly matching strength of the received preamble sequence with a preset strength threshold of the base station, a response message to respond to the user equipment, so as to enable the user equipment to gain access to the base station.

However, a preamble sequence sent by user equipment located in a basement or other user equipment with a relatively great link loss has a relatively great loss in a transmission process, which accordingly causes that the base station cannot correctly receive the preamble sequence or that signal strength of the received preamble sequence is relatively low, and as a result, matching cannot be correctly performed for the preamble sequence. If no response message is received by the user equipment from the base station within a preset time, the user equipment selects another random access channel to send a reselected preamble sequence to the base station, which makes the user equipment continually send a randomly selected preamble sequence to the base station; however, the base station still cannot perform matching correctly, thereby causing a decrease in a matching probability of the base station and a decrease in efficiency of gaining access to the base station by the user equipment.

SUMMARY

Embodiments of the present invention provide a preamble sequence transmission method, apparatus, and system, which can enhance signal strength of a preamble sequence received by a base station, so as to increase a matching probability of the base station and increase efficiency of gaining access to the base station by user equipment.

To achieve the foregoing objective, the following technical solutions are adopted in the embodiments of the present invention.

According to a first aspect, an embodiment of the present invention provides a preamble sequence transmission method. The method includes acquiring system information or a physical broadcast channel PBCH that is broadcast by a base station, where the system information or the PBCH includes a preset physical random access channel PRACH, the preset PRACH includes m preset radio frames, and m is a positive integer; determining that a quantity of repetition times of a preamble sequence, which is used for random access, at a preset resource location of the preset PRACH is n, where $1 \leq n \leq 10$ m; and sending, at n preset resource locations of the preset PRACH, the preamble sequence to the base station.

In a first possible implementation manner of the first aspect, a method for the determining that a quantity of repetition times of a preamble sequence, which is used for random access, at a preset resource location of the preset PRACH is n specifically includes: determining, according to the system information or the PBCH, that the quantity of repetition times of the preamble sequence at the preset resource location of the preset PRACH is n; or, receiving a downlink reference signal sent by the base station; and determining, according to the downlink reference signal, that the quantity of repetition times of the preamble sequence at the preset resource location of the preset PRACH is n; or, determining, according to a pre-formulated wireless communication protocol, that the quantity of repetition times of the preamble sequence at the preset resource location of the preset PRACH is n.

With reference to the first aspect or the first possible implementation manner of the first aspect, in a second possible implementation manner, the sending, at n preset resource locations of the preset PRACH, the preamble sequence to the base station includes: sending, within n preset subframes of the m preset radio frames in the preset PRACH, the preamble sequence to the base station.

With reference to the first aspect or any implementation manner of the first possible implementation manner to the second possible implementation manner of the first aspect, in a third possible implementation manner, after the sending, at n preset resource locations of the preset PRACH, the preamble sequence to the base station, the method further includes: if no response message is received from the base station, sending, at p preset resource locations of the preset PRACH, the preamble sequence to the base station, where $p > n$.

According to a second aspect, an embodiment of the present invention further provides a preamble sequence transmission method. The method includes broadcasting system information or a PBCH, where the system information or the PBCH includes a preset PRACH, the preset PRACH includes m preset radio frames, and m is a positive integer. The method also includes receiving, at n preset resource locations of the preset PRACH, k preamble sequences from user equipment, where the k preamble sequences are sent at the n preset resource locations of the preset PRACH after the user equipment determines that a quantity of repetition times of the preamble sequence, which is used for random access, at a preset resource location of the preset PRACH is n, where $1 \leq n \leq 10$ m, and $k \leq n$.

In a first possible implementation manner of the second aspect, before the receiving, at n preset resource locations of the preset PRACH, k preamble sequences from user equipment, the method further includes: sending a downlink reference signal, so that the user equipment determines, according to the received downlink reference signal, that the quantity of repetition times of the preamble sequence at the preset resource location of the preset PRACH is n.

With reference to the second aspect or the first possible implementation manner of the second aspect, in a second possible implementation manner, the receiving, at n preset resource locations of the preset PRACH, k preamble sequences from user equipment includes: receiving, within n preset subframes of the m preset radio frames in the preset PRACH, the k preamble sequences from the user equipment.

According to a third aspect, an embodiment of the present invention provides user equipment. The user equipment includes a first receiving unit, configured to acquire system information or a PBCH that is broadcast by a base station, where the system information or the PBCH includes a preset PRACH, the preset PRACH includes m preset radio frames, and m is a positive integer. The user equipment also includes a first processing unit, configured to determine that a quantity of repetition times of a preamble sequence, which is used for random access, at a preset resource location of the preset PRACH is n, where $1 \leq n \leq 10$ m. The user equipment also includes a first sending unit, configured to send, at n preset resource locations of the preset PRACH, the preamble sequence to the base station.

In a first possible implementation manner of the third aspect, the first processing unit is specifically configured to determine, according to the system information or the PBCH, that the quantity of repetition times of the preamble sequence at the preset resource location of the preset PRACH is n; or, the first receiving unit is specifically configured to receive a downlink reference signal sent by the base station, and the first processing unit is specifically configured to determine, according to the downlink reference signal, that the quantity of repetition times of the preamble sequence at the preset resource location of the preset PRACH is n; or, the first processing unit is specifically configured to determine, according to a pre-formulated wireless communication protocol, that the quantity of repetition times of the preamble sequence at the preset resource location of the preset PRACH is n.

With reference to the third aspect or the first possible implementation manner of the third aspect, in a second possible implementation manner, the first sending unit is specifically configured to send, within n preset subframes of the m preset radio frames in the preset PRACH, the preamble sequence to the base station.

With reference to the third aspect or any implementation manner of the first possible implementation manner to the second possible implementation manner of the third aspect, in a third possible implementation manner, the first sending unit is configured to after sending, at the n preset resource locations of the preset PRACH, the preamble sequence to the base station, if no response message is received by the first receiving unit from the base station, send, at p preset resource locations of the preset PRACH, the preamble sequence to the base station, where p>n.

According to a fourth aspect, an embodiment of the present invention provides a base station. The base station includes a second sending unit, configured to broadcast system information or a PBCH, where the system information or the PBCH includes a preset PRACH, the preset PRACH includes m preset radio frames, and m is a positive integer. The base station also includes a second receiving unit, configured to receive, at n preset resource locations of the preset PRACH, k preamble sequences from user equipment, where the k preamble sequences are sent at the n preset resource locations of the preset PRACH after the user equipment determines that a quantity of repetition times of the preamble sequence, which is used for random access, at a preset resource location of the preset PRACH is n, where $1 \leq n \leq 10$ m, and $k \leq n$.

In a first possible implementation manner of the fourth aspect, the second sending unit is further configured to send a downlink reference signal, so that the user equipment determines, according to the received downlink reference signal, that the quantity of repetition times of the preamble sequence at the preset resource location of the preset PRACH is n.

With reference to the fourth aspect or the first possible implementation manner of the fourth aspect, in a second possible implementation manner, the second receiving unit is specifically configured to receive, within n preset subframes of the m preset radio frames in the preset PRACH, the k preamble sequences from the user equipment.

According to a fifth aspect, an embodiment of the present invention provides a preamble sequence transmission system, including: the user equipment according to the third aspect and the base station according to the fourth aspect.

The embodiments of the present invention provide a preamble sequence transmission method, apparatus, and system, where the method includes: acquiring system information or a physical broadcast channel PBCH that is broadcast by a base station, where the system information or the PBCH includes a preset physical random access channel PRACH, the preset PRACH includes m preset radio frames, and m is a positive integer; determining that a quantity of repetition times of a preamble sequence, which is used for random access, at a preset resource location of the preset PRACH is n, where $1 \leq n \leq 10$ m; and sending, at n preset resource locations of the preset PRACH, the preamble sequence to the base station. By using this solution, user equipment sends, at the n preset resource locations of the preset PRACH, the preamble sequence to the base station, that is, the quantity of repetition times of the preamble sequence sent by the user equipment to the base station increases; therefore, signal strength of the preamble sequence received by the base station is enhanced, so that the preamble sequence can be correctly matched, thereby increasing a matching probability of the base station and increasing efficiency of gaining access to a cell by the user equipment.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic structural diagram of a PRACH in the prior art;

FIG. 2 is method flowchart 1 of a preamble sequence transmission method according to an embodiment of the present invention;

DETAILED DESCRIPTION OF ILLUSTRATIVE EMBODIMENTS

Figure 3:
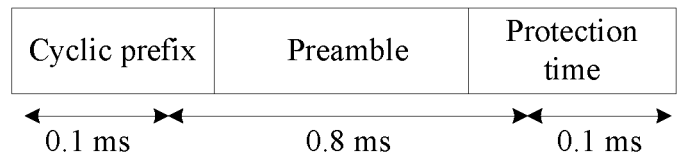
FIG. 3 is schematic structural diagram 1 of a preamble sequence according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the prior art, a process in which user equipment randomly gains access to a base station is the first step for the user equipment to implement uplink synchronization and establish a connection to the base station. In the process in which the user equipment gains access to the base station, the user equipment first receives system information or a PBCH (Physical Broadcast Channel) that is broadcast by the base station, and then transmits, according to the system information or the PBCH and on a selected random access channel, a randomly selected preamble sequence to the base station; and afterward, the user equipment waits to receive a response message that is from the base station and is corresponding to the preamble sequence. If no response message is received by the user equipment from the base station within a preset time, the user equipment selects another random access channel to resend a reselected preamble sequence to the base station.

It should be noted that the system information or the PBCH that is broadcast by the base station includes a PRACH (Physical Random Access Channel) and a preamble sequence available to the user equipment.

A PRACH is shown in FIG. 1. The PRACH may be used to indicate a random access resource that can be used in a process in which user equipment gains access to a base station. The PRACH shown in FIG. 1 includes two 10 ms radio frames, that is, includes twenty 1 ms subframes. Five opportunities to send a preamble sequence are set in each frame, and a start point of the preamble sequence is aligned with a start point of a corresponding uplink subframe of the user equipment (it is assumed that a timing advance is 0).

Further, corresponding to the PRACH shown in FIG. 1, in the time domain, the user equipment may send, within a subframe that is set in the PRACH, the preamble sequence once to the base station; in the frequency domain, the preamble sequence occupies six PRBs (Physical Resource Block, physical resource block). It should be noted that one PRB includes one timeslot in the time domain, and is composed of 12 subcarriers in the frequency domain. Particularly, each subframe includes two timeslots.

Embodiment 1

This embodiment of the present invention provides a preamble sequence transmission method, and relates to a user equipment side. As shown in FIG. 2, the method includes:

S101. User equipment acquires system information or a physical broadcast channel PBCH that is broadcast by a base station, where the system information or the PBCH includes a preset physical random access channel PRACH, the preset PRACH includes m preset radio frames, and m is a positive integer.

In this embodiment of the present invention, once the user equipment enters coverage of the base station, the user equipment can acquire the system information or the PBCH that is broadcast by the base station, where the system information or the PBCH includes the preset PRACH and multiple preamble sequences available to the user equipment. Both the preset PRACH and the available preamble sequences are necessary conditions for the user equipment to gain access to the base station.

The preset PRACH includes the m preset radio frames, where m is a positive integer, that is, a value of m may be 1, 2, 3, . . . , and so on, which is not limited in the present invention.

S102. The user equipment determines that a quantity of repetition times of a preamble sequence, which is used for random access, at a preset resource location of the preset PRACH is n, where $1 \leq n \leq 10\,m$.

The user equipment may randomly select, from the multiple preamble sequences according to the acquired system information or PBCH that is from the base station, one preamble sequence used for random access. In addition, the user equipment may determine, according to a preset rule, that the quantity of repetition times of the preamble sequence, which is used for random access by the user equipment, at the preset resource location of the preset PRACH is n, where 1≤n≤10 m.

Figure 4:
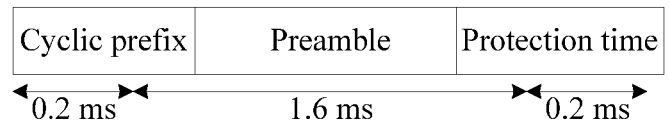
FIG. 4 is schematic structural diagram 2 of a preamble sequence according to an embodiment of the present invention.
Figure 5:
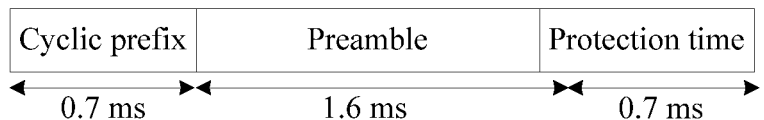
FIG. 5 is schematic structural diagram 3 of a preamble sequence according to an embodiment of the present invention.

A signal format of the preamble sequence is shown in FIG. 3, and includes a CP (Cyclic Prefix), a preamble, and a protection time. In an FDD (Frequency Division Duplex) system, three signal formats of preamble sequences are defined, and are respectively signal formats of a 1 ms preamble sequence, a 2 ms preamble sequence, and a 3 ms preamble sequence. FIG. 3 shows a signal format of a 1 ms preamble sequence. In the 1 ms preamble sequence, a length of a preamble is 0.8 ms, and a length of a CP and a length of a protection time are both 0.1 ms. FIG. 4 shows a signal format of a 2 ms preamble sequence. In the 2 ms preamble sequence, a length of a preamble is 1.6 ms, and a length of a CP and a length of a protection time are both 0.2 ms. FIG. 5 shows is a signal format of a 3 ms preamble sequence. In the 3 ms preamble sequence, a length of a preamble is 1.6 ms, and a length of a CP and a length of a protection time are both 0.7 ms.

It should be noted that different preamble sequences are applied to different scenarios, and may be selected according to different base station coverage. Generally, a greater length of a CP indicates that a preamble sequence can be applicable to a case in which a round-trip delay is longer, that is, larger base station coverage can be supported. The length of a preamble mainly affects quality of receiving a preamble sequence by the base station, and a longer preamble means that the base station can obtain better received quality and therefore obtains better demodulation performance.

Particularly, the signal format of the preamble sequence in this embodiment of the present invention may be 1 ms, 2 ms, 3 ms, or any other preamble sequence that meets a design requirement, which is not limited in the present invention.

Exemplarily, that the preamble sequence provided in this embodiment of the present invention is 1 ms is used as an example. If the preset PRACH includes two preset 10 ms radio frames, the preamble sequence may be sent once within each subframe of each preset 10 ms radio frame. In this case, a quantity of repetition times of the preamble sequence sent by the user equipment to the base station within the two preset 10 ms radio frames may be 20 at most. Preferably, if a quantity of repetition times of the preamble sequence sent by the user equipment to the base station is $2^x$, where x is a positive integer, and $2≤2^x≤20$, the quantity of repetition times of the preamble sequence sent by the user equipment to the base station within two 10 ms radio frames may be $2^1$ (that is, two), $2^2$ (that is, four), $2^3$ (that is, eight), or $2^4$ (that is, 16). Similarly, if the preset PRACH includes four preset 10 ms radio frames, preferably, the quantity of repetition times of the preamble sequence sent by the user equipment to the base station may be $2^5$ (that is, 32) at most.

Certainly, if the preamble sequence provided in this embodiment of the present invention is 2 ms, within the two preset 10 ms radio frames in the preset PRACH, the user equipment may send the preamble sequence to the base station once within each two subframes; that is, within the two radio frames, the quantity of repetition times of the preamble sequence sent by the user equipment to the base station may be 10 at most. Preferably, the quantity of repetition times of the preamble sequence sent by the user equipment to the base station may be 2, 4, or 8.

S103. The user equipment sends, at n preset resource locations of the preset PRACH, the preamble sequence to the base station.

The user equipment may send, at the n preset resource locations of the preset PRACH, the preamble sequence to the base station, so that the base station returns, after adding up and performing matching for all received same preamble sequences, a response message corresponding to the preamble sequence, thereby enabling the user equipment to gain access to the base station.

Figure 6:
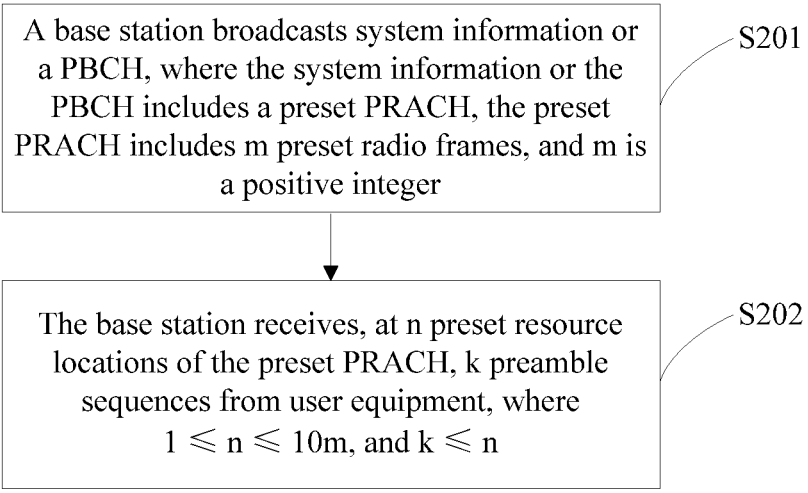
FIG. 6 is method flowchart 2 of a preamble sequence transmission method according to an embodiment of the present invention.

This embodiment of the present invention provides a preamble sequence transmission method, and relates to a base station side. As shown in FIG. 6, the method includes:

S201. A base station broadcasts system information or a PBCH, where the system information or the PBCH includes a preset PRACH, the preset PRACH includes m preset radio frames, and m is a positive integer.

The base station periodically broadcasts the system information or the PBCH within coverage of the base station, where the system information or the PBCH includes the preset PRACH and multiple preamble sequences available to the user equipment, the preset PRACH includes the m preset radio frames, and m is a positive integer, that is, a value of m may be 1, 2, 3, . . . , and so on, which is not limited in the present invention.

S202. The base station receives, at n preset resource locations of the preset PRACH, k preamble sequences from user equipment, where 1≤n≤10 m, and k≤n.

The base station receives, at the n preset resource locations of the preset PRACH, the k preamble sequences from the user equipment, where the k preamble sequences are selected by the user equipment according to the acquired system information or PBCH that is broadcast by the base station and from the multiple preamble sequences that are available to the user equipment and are broadcast by the base station; and the k preamble sequences are sent at the n preset resource locations of the preset PRACH according to a preset rule after it is determined that a quantity of repetition times of the preamble sequence, which is used for random access, at a preset resource location of the preset PRACH is n, where 1≤n≤10 m, and k≤n.

Particularly, the signal format of the preamble sequence provided in this embodiment of the present invention may be 1 ms, 2 ms, 3 ms, or any other preamble sequence that meets a requirement, which is not limited in the present invention.

It should be noted that, in this embodiment of the present invention, the provided preamble sequence transmission method on the user equipment side is corresponding to the provided preamble sequence transmission method on the base station side; that is, the user equipment sends the preamble sequence at the n preset resource locations of the preset PRACH, and the base station receives the preamble sequence at the n preset resource locations of the preset PRACH.

It may be understood by a person skilled in the art that, a phenomenon of a transmission failure may exist in a preamble sequence transmission process; therefore, a quantity of preamble sequences received by the base station at the n preset resource locations of the preset PRACH is k, where k n.

In this embodiment of the present invention, user equipment sends, at n preset resource locations of a preset PRACH, a preamble sequence to a base station, that is, a quantity of repetition times of the preamble sequence sent by the user equipment to the base station increases; therefore, signal strength of the preamble sequence received by the base station is enhanced, so that the preamble sequence can be correctly matched, thereby increasing a matching probability of the base station and increasing efficiency of gaining access to a cell by the user equipment.

Figure 7:
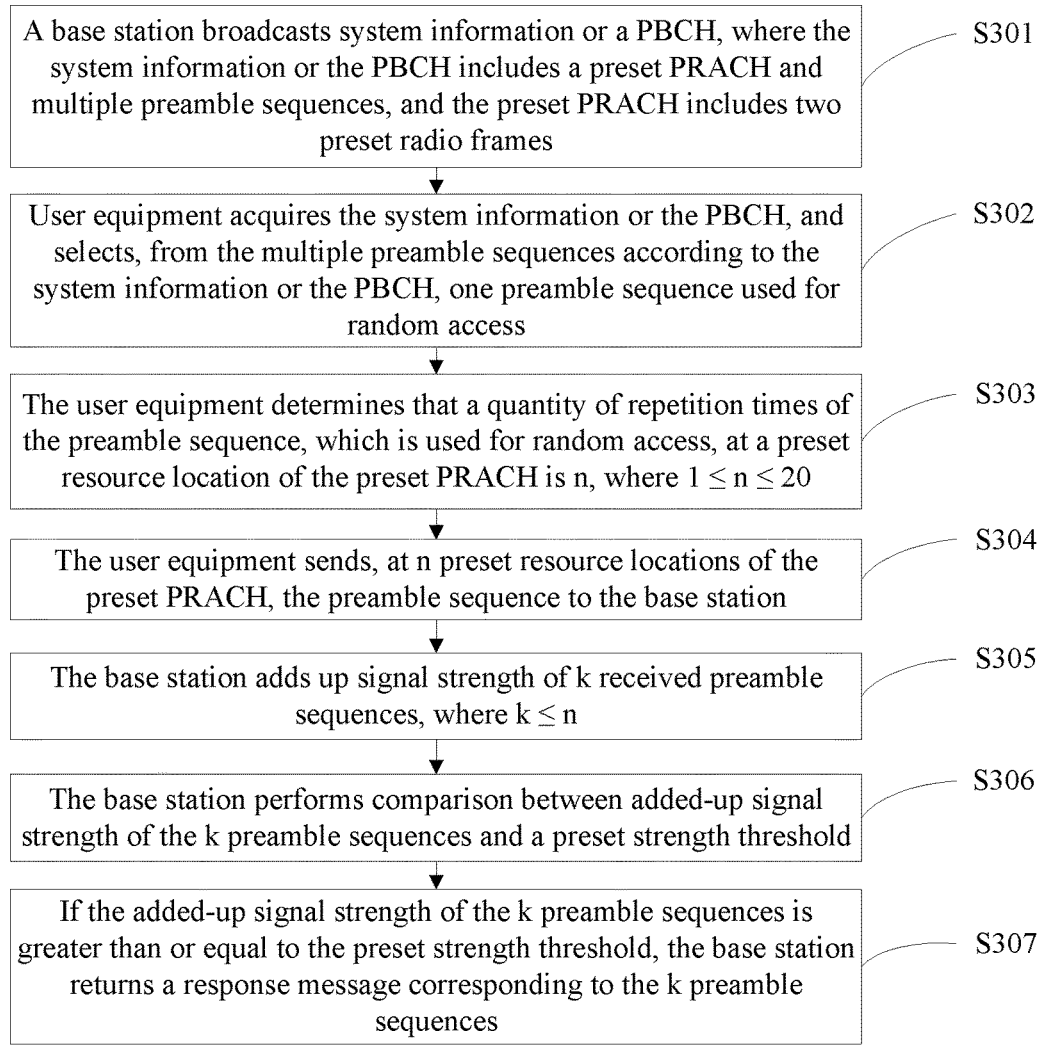
FIG. 7 is method flowchart 3 of a preamble sequence transmission method according to an embodiment of the present invention.

Exemplarily, in the present invention, it is assumed that m=2, that is, a preset PRACH includes two preset radio frames, and a preamble sequence is a 1 ms preamble sequence. This embodiment of the present invention further provides a preamble sequence transmission method. As shown in FIG. 7, the method includes:

S301. A base station broadcasts system information or a PBCH, where the system information or the PBCH includes a preset PRACH and multiple preamble sequences, and the preset PRACH includes two preset radio frames.

The base station periodically broadcasts the system information or the PBCH within coverage of the base station, where the system information or the PBCH includes the preset PRACH and the multiple preamble sequences available to user equipment, and the preset PRACH includes the two preset radio frames. Both the preset PRACH and the available preamble sequences are necessary conditions for the user equipment to gain access to the base station.

S302. User equipment acquires the system information or the PBCH, and selects, from the multiple preamble sequences according to the system information or the PBCH, one preamble sequence used for random access.

The user equipment acquires the system information or the PBCH that is broadcast by the base station, and randomly selects, from the multiple preamble sequences available to the user equipment and according to the acquired system information or PBCH, the preamble sequence used for random access.

S303. The user equipment determines that a quantity of repetition times of the preamble sequence, which is used for random access, at a preset resource location of the preset PRACH is n, where $1 \leq n \leq 20$.

Exemplarily, it is assumed that m=2, and therefore, a value of n may be 1, 2, 3, 4, . . . , or 20; that is, if the preset PRACH includes two preset radio frames, the quantity of repetition times of the preamble sequence sent by the user equipment to the base station may be 1, 2, 3, 4, . . . , or 20. Preferably, the quantity of repetition times of the preamble sequence sent by the user equipment to the base station may be 2, 4, 8, or 16. Specifically, the quantity of repetition times of the preamble sequence sent by the user equipment to the base station may be adaptively adjusted according to an actual requirement and design, and is not limited in the present invention.

In an LTE (Long Term Evolution) system, each radio frame is generally 10 ms.

Specifically, a method for determining, by the user equipment according to a preset rule, that the quantity of repetition times of the preamble sequence, which is used for random access, at the preset resource location of the preset PRACH is n may be any one of the following.

(1) The user equipment determines, according to the system information or the PBCH, that the quantity of repetition times of the preamble sequence at the preset resource location of the preset PRACH is n.

The user equipment may learn, from the system information or the PBCH that is broadcast by the base station and is received downlink, the quantity of repetition times of the preamble sequence, which is sent to the base station, at the preset resource location of the preset PRACH is n.

It should be noted that, in this embodiment of the present invention, downlink may be defined as a process in which the base station sends a signal to the user equipment; and oppositely, uplink may be defined as a process in which the user equipment sends a signal to the base station.

(2) The user equipment receives a downlink reference signal sent by the base station, and determines, according to the downlink reference signal, that the quantity of repetition times of the preamble sequence at the preset resource location of the preset PRACH is n.

The user equipment may measure its own link loss according to the received downlink reference signal sent by the base station, and different link loss levels correspond to different quantities of repetition times of the preamble sequence at the preset resource location of the preset PRACH.

Exemplarily, that the preamble sequence provided in this embodiment of the present invention is 1 ms is used as an example. It is assumed that the preset PRACH includes two preset 10 ms radio frames; therefore, the preamble sequence may be sent once within each subframe of each 10 ms radio frame. In this case, a quantity of repetition times of the preamble sequence sent by the user equipment to the base station within the two preset 10 ms radio frames may be 20 at most. Preferably, if a quantity of repetition times of the preamble sequence sent by the user equipment to the base station is $2^x$, where x is a positive integer, and $2 \leq 2^x \leq 20$, the quantity of repetition times of the preamble sequence sent by the user equipment to the base station within two preset 10 ms radio frames may be $2^1$ (that is, two), $2^2$ (that is, four), $2^3$ (that is, eight), or $2^4$ (that is, 16).

Further, is the setting is performed according to the preferred quantity of repetition times of the preamble sequence sent by the user equipment to the base station within the two preset 10 ms radio frames. If the link loss is less than 50 dB, a corresponding quantity of repetition times of the preamble sequence is four; if the link loss is greater than or equal to 50 dB, and less than or equal to 100 dB, a corresponding quantity of repetition times of the preamble sequence is eight; if the link loss is greater than or equal to 100 dB, a corresponding quantity of repetition times of the preamble sequence is 16.

(3) The user equipment may determine, according to a pre-formulated wireless communication protocol, that the quantity of repetition times of the preamble sequence at the preset resource location of the preset PRACH is n.

The user equipment may learn, from the pre-formulated wireless communication protocol, that the quantity of repetition times of the preamble sequence, which is sent to the base station, at the preset resource location of the preset PRACH is n. Specifically, when formulating the wireless communication protocol, operators set, by means of a mutual agreement, that the quantity of repetition times of the preamble sequence, which is sent by the user equipment to the base station, at the preset resource location of the preset PRACH is n.

S304. The user equipment sends, at n preset resource locations of the preset PRACH, the preamble sequence to the base station.

The user equipment may send, at the n preset resource locations of the preset PRACH, the preamble sequence to the base station.

Further, the user equipment may send, at n preset resource locations of two preset radio frames in the preset PRACH, the preamble sequence to the base station.

Further, the user equipment may send, within n preset subframes of the two preset radio frames in the preset PRACH, the preamble sequence to the base station.

It should be noted that the n preset resource locations of the preset PRACH provided in this embodiment of the present invention include the n preset resource locations of the two preset radio frames in the preset PRACH.

Further, the n preset resource locations of the two preset radio frames in the preset PRACH provided in this embodiment of the present invention specifically include the n preset subframes of the two preset radio frames in the preset PRACH.

Figure 8:
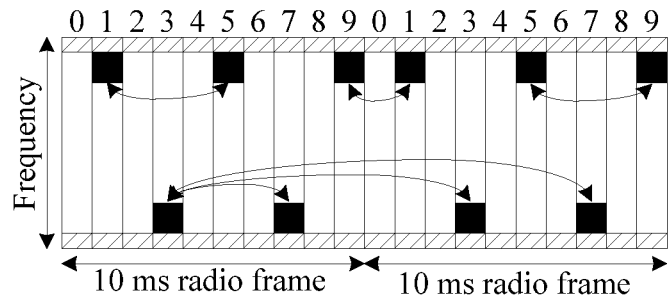
FIG. 8 is schematic structural diagram 1 of a preset PRACH according to an embodiment of the present invention.

Exemplarily, as shown in FIG. 8, FIG. 8 is a schematic structural diagram of a preset PRACH according to an embodiment of the present invention, where the preset PRACH includes two consecutive preset radio frames.

If n=2, that is, the user equipment sends, at two preset resource locations of the two preset radio frames, the preamble sequence to the base station, as shown in FIG. 8, the user equipment may separately send, in subframe 1 of a first frame and subframe 5 of the first frame, the preamble sequence once to the base station; or the user equipment may separately send, in subframe 9 of a first frame and subframe 1 of a second frame, the preamble sequence once to the base station; or the user equipment may separately send, in subframe 5 of a second frame and subframe 9 of the second frame, the preamble sequence once to the base station.

If n=4, that is, the user equipment sends, at four preset resource locations of the two preset radio frames, the preamble sequence to the base station, as shown in FIG. 8, the user equipment may separately send, in subframe 3 of a first frame, subframe 7 of the first frame, subframe 3 of a second frame, and subframe 7 of the second frame, the preamble sequence once to the base station.

Figure 9:
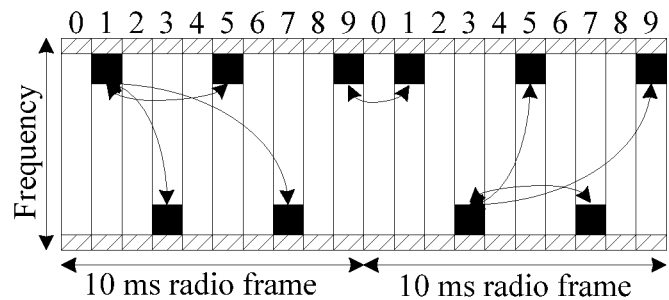
FIG. 9 is schematic structural diagram 2 of a preset PRACH according to an embodiment of the present invention.

Exemplarily, as shown in FIG. 9, FIG. 9 is a schematic structural diagram of another preset PRACH according to an embodiment of the present invention, where the another preset PRACH includes two consecutive preset radio frames.

If n=2, that is, the user equipment sends, at two preset resource locations of the two preset radio frames, the preamble sequence to the base station, as shown in FIG. 9, the user equipment may separately send, in subframe 9 of a first frame and subframe 1 of a second frame, the preamble sequence once to the base station.

If n=4, that is, the user equipment sends, at four preset resource locations of the two preset radio frames, the preamble sequence to the base station, as shown in FIG. 9, the user equipment may separately send, in subframe 1 of a first frame, subframe 3 of the first frame, subframe 5 of the first frame, and subframe 7 of the first frame, the preamble sequence once to the base station; or the user equipment may separately send, in subframe 3 of a second frame, subframe 5 of the second frame, subframe 7 of the second frame, and subframe 9 of the second frame, the preamble sequence once to the base station.

It should be noted that the foregoing schematic structural diagrams of the preset PRACH are only for exemplary illustration of this embodiment of the present invention. A person of ordinary skill in the art may understand that the preset PRACH provided in the present invention, that is, the preset resource location of the preset PRACH provided in the present invention may be adaptively adjusted according to an actual requirement, and is not limited in the present invention.

S305. The base station adds up signal strength of k received preamble sequences, where k≤n.

The base station adds up the signal strength of the k received preamble sequences after the base station receives, at the n preset resource locations of the preset PRACH, the k preamble sequences from the user equipment, where k≤n.

S306. The base station performs comparison between added-up signal strength of the k preamble sequences and a preset strength threshold.

The base station performs comparison between the added-up signal strength of the k preamble sequences and the preset strength threshold, that is, the base station performs matching between the added-up signal strength of the k preamble sequences and the preset strength threshold.

S307. If the added-up signal strength of the k preamble sequences is greater than or equal to the preset strength threshold, the base station returns a response message corresponding to the k preamble sequences.

If the added-up signal strength of the k preamble sequences is greater than or equal to the preset strength threshold, that is, the signal strength obtained by the base station by adding up the k received preamble sequences can match the preset strength threshold, the base station returns the response message corresponding to the k preamble sequences to the user equipment.

A person of ordinary skill in the art may understand that, that the base station adds up the signal strength of the k received preamble sequences may be that the base station adds up the signal strength of the k received preamble sequences, so as to obtain total signal strength of the k received preamble sequences. The base station performs comparison between the total signal strength and the preset strength threshold, that is, the base station performs matching between the total signal strength and the preset strength threshold; if the total signal strength is greater than or equal to the preset strength threshold, that is, the total signal strength can correctly match the preset strength threshold, the base station sends the response message corresponding to the k preamble sequences to the user equipment, so that the user equipment gains access to the base station.

It should be noted that the quantity of repetition times proposed in each of the foregoing three methods for determining, by the user equipment, the quantity of repetition times of the preamble sequence, which is used for random access, at the preset resource location of the preset PRACH is a maximum quantity of repetition times pre-formulated according to a maximum link loss of the user equipment, so as to implement that, after the user equipment sends the selected preamble sequence at the n preset resource locations of the preset PRACH, the base station can correctly perform matching for the k received preamble sequences and return a corresponding response message to the user equipment, thereby increasing a matching probability of the base station and increasing efficiency of gaining access to the base station by the user equipment.

In another implementation manner of the preamble sequence transmission method provided in this embodiment of the present invention, after the user equipment send, at the n preset resource locations of the preset PRACH, the preamble sequence to the base station according to the preset PRACH, if no response message that is from the base station and is corresponding to the preamble sequence is detected by the user equipment within a preset time, the user equipment may send, at p preset resource locations of the preset PRACH, the preamble sequence to the base station, where p>n.

A person of ordinary skill in the art may understand that, after the user equipment sends, at the n preset resource locations of the preset PRACH, the preamble sequence to the base station, if no corresponding response message is received by the user equipment from the base station within a preset time, the user equipment may send, at p preset resource locations of the preset PRACH, the preamble sequence to the base station, where p>n.

It should be noted that the foregoing n preset resource locations of the preset PRACH may be specifically n preset subframes of two preset radio frames in the preset PRACH, where the n preset subframes are preset subframes in which the preamble sequence is repeatedly sent. Correspondingly, the foregoing p preset resource locations of the preset PRACH may also be specifically p preset subframes of the two preset radio frames in the preset PRACH, where the p preset subframes are preset subframes in which the preamble sequence is repeatedly sent. The n preset subframes and the p preset subframes may be same subframes or may be different subframes.

Particularly, when one subframe includes, in the frequency domain, two available resource locations that are used to send the preamble sequence, two resource locations in a same subframe may be respectively preset to a location for n-times repetition of the preamble sequence and a location for p-times repetition of the preamble sequence; and in this case, a subframe in which the preamble sequence repeats n times and a subframe in which the preamble sequence repeats p times are a same subframe. Correspondingly, if one subframe includes only one available resource location used to send the preamble sequence, the available resource location may be preset to a location for n-times repetition of the preamble sequence or a location for p-times repetition of the preamble sequence; and in this case, a subframe in which the preamble sequence repeats n times and a subframe in which the preamble sequence repeats p times are different subframes.

Figure 10:
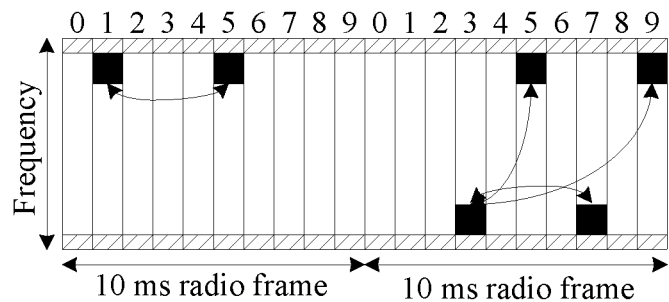
FIG. 10 is schematic structural diagram 3 of a preset PRACH according to an embodiment of the present invention.

Specifically, as shown in FIG. 10, after the user equipment separately sends, in subframe 1 of a first frame and subframe 5 of the first frame, the preamble sequence once to the base station, if no response message that is from the base station and is corresponding to the preamble sequence is received, the user equipment may separately send, in subframe 3 of a second frame, subframe 5 of the second frame, subframe 7 of the second frame, and subframe 9 of the second frame, the preamble sequence once to the base station.

It should be noted that the foregoing schematic structural diagram of the preset PRACH is only for exemplary illustration of this embodiment of the present invention. A person of ordinary skill in the art may understand that the preset PRACH provided in the present invention, that is, the preset resource location of the preset PRACH provided in the present invention may be adaptively adjusted according to an actual requirement, and is not limited in the present invention.

Further, the described preamble sequence transmission method and another implementation manner of the preamble sequence transmission method provided in this embodiment of the present invention are both applicable to an FDD system and a TDD (Time Division Duplex, time division duplex) system.

This embodiment of the present invention further provides another implementation manner of the preamble sequence transmission method. In the implementation manner, a signal format of the preamble sequence is changed, that is, concatenation is performed on preamble sequences in the prior art to form a new preamble sequence, and the preset resource locations of the preset PRACH are preset to consecutive subframes to send the new preamble sequence.

Figure 11:
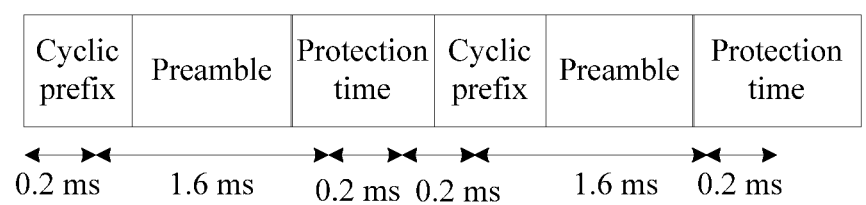
FIG. 11 is schematic structural diagram 4 of a preamble sequence according to an embodiment of the present invention.

Exemplarily, FIG. 11 shows a new preamble sequence formed after concatenation is performed on two 2 ms preamble sequences in the prior art. It can be learned from FIG. 11 that a length of a CP and a length of a protection time in each 2 ms preamble sequence of the new preamble sequence remain unchanged, that is, a radius of base station coverage supported by the new preamble sequence is the same as a radius of base station coverage supported by the 2 ms preamble sequence.

Particularly, if the preset PRACH provided in this embodiment of the present invention includes two preset 10 ms radio frames, for a 1 ms preamble sequence, one opportunity to send the 1 ms preamble sequence may be preset in each subframe of each preset 10 ms radio frame; for a 2 ms preamble sequence, one opportunity to send the 2 ms preamble sequence may be preset in each two consecutive subframes of each preset 10 ms radio frame. In that way, for the new preamble sequence formed after concatenation is performed on the two 2 ms preamble sequences, one opportunity to send the new preamble sequence may be preset in each four consecutive subframes of each preset 10 ms radio frame.

Figure 12:
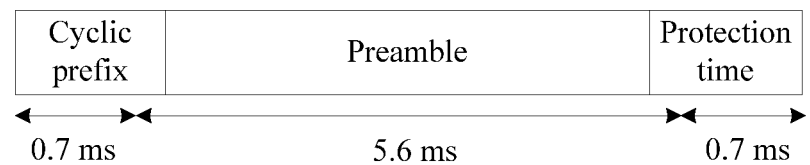
FIG. 12 is schematic structural diagram 5 of a preamble sequence according to an embodiment of the present invention.

Exemplarily, FIG. 12 shows a new preamble sequence formed after concatenation is performed on seven 1 ms preamble sequences in the prior art. It can be learned from FIG. 12 that a preamble, a CP, and a protection time of the preamble sequence are all seven times a preamble, a CP, and a protection time of a 1 ms preamble sequence; that is, because the CP and the protection time increase, a radius of base station coverage supported by the new preamble sequence is greater than a radius of base station coverage supported by the 1 ms preamble sequence.

It should be noted that a signal format of the new preamble sequence needs to be defined in the foregoing another implementation manner of the preamble sequence transmission method, and the preset resource locations of the preset PRACH need to be preset to consecutive subframes to send the new preamble sequence. Particularly, the implementation manner is only applicable to an FDD system.

According to the preamble sequence transmission method provided in this embodiment of the present invention, system information or a physical broadcast channel PBCH that is broadcast by a base station is acquired, where the system information or the PBCH includes a preset physical random access channel PRACH, the preset PRACH includes m preset radio frames, and m is a positive integer; it is determined that a quantity of repetition times of a preamble sequence, which is used for random access, at a preset resource location of the preset PRACH is n, where $1 \leq n \leq 10$ m; and the preamble sequence is sent to the base station at n preset resource locations of the preset PRACH. By using this solution, user equipment sends, at the n preset resource locations of the preset PRACH, the preamble sequence to the base station, that is, the quantity of repetition times of the preamble sequence sent by the user equipment to the base station increases; therefore, signal strength of the preamble sequence received by the base station is enhanced, so that the preamble sequence can be correctly matched, thereby increasing a matching probability of the base station and increasing efficiency of gaining access to a cell by the user equipment.

Embodiment 2

Figure 13:
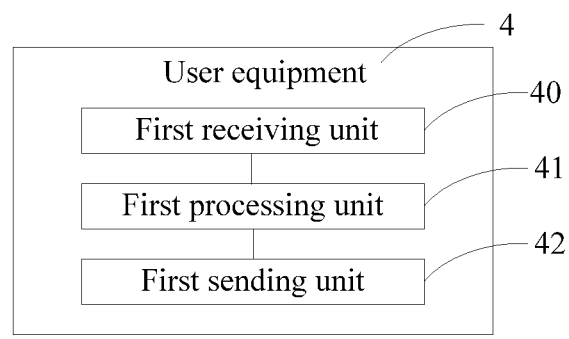
FIG. 13 is schematic structural diagram 1 of user equipment according to an embodiment of the present invention.

As shown in FIG. 13, this embodiment of the present invention provides user equipment 4, including: a first receiving unit 40, configured to acquire system information or a PBCH that is broadcast by a base station, where the system information or the PBCH includes a preset PRACH, the preset PRACH includes m preset radio frames, and m is a positive integer; a first processing unit 41, configured to determine that a quantity of repetition times of a preamble sequence, which is used for random access, at a preset resource location of the preset PRACH is n, where $1 \leq n \leq 10$ m; and a first sending unit 42, configured to send, at n preset resource locations of the preset PRACH, the preamble sequence to the base station.

The first processing unit 41 is specifically configured to determine, according to the system information or the PBCH, that the quantity of repetition times of the preamble sequence at the preset resource location of the preset PRACH is n; or the first receiving unit 40 is specifically configured to receive a downlink reference signal sent by the base station, and the first processing unit 41 is specifically configured to determine, according to the downlink reference signal, that the quantity of repetition times of the preamble sequence at the preset resource location of the preset PRACH is n; or the first processing unit 41 is specifically configured to determine, according to a pre-formulated wireless communication protocol, that the quantity of repetition times of the preamble sequence at the preset resource location of the preset PRACH is n.

The first processing unit 41 is further configured to select, from multiple available preamble sequences according to the system information or the PBCH, one preamble sequence used for random access.

Further, the first sending unit 42 is specifically configured to send, at the n preset resource locations of the m preset radio frames in the preset PRACH, the preamble sequence to the base station.

Further, the first sending unit 42 is specifically configured to send, within n preset subframes of the m preset radio frames in the preset PRACH, the preamble sequence to the base station.

Referring to FIG. 8, a 1 ms preamble sequence and that the preset PRACH includes two consecutive preset 10 ms radio frames are used as an example in this embodiment of the present invention. Corresponding to the preset PRACH provided in this embodiment of the present invention, if the quantity of repetition times of the preamble sequence sent by the user equipment to the base station is two, the first sending unit 42 is specifically configured to separately send, in subframe 1 of a first frame and subframe 5 of the first frame, the preamble sequence once to the base station; or the first sending unit 42 separately sends, in subframe 9 of the first frame and subframe 1 of a second frame, the preamble sequence once to the base station; or the first sending unit 42 separately sends, in subframe 5 of the second frame and subframe 9 of the second frame, the preamble sequence once to the base station.

Alternatively, if the quantity of repetition times of the preamble sequence sent by the user equipment to the base station is four, the first sending unit 42 is specifically configured to separately send, in subframe 3 of the first frame, subframe 7 of the first frame, subframe 3 of the second frame, and subframe 7 of the second frame, the preamble sequence once to the base station.

Referring to FIG. 9, a 1 ms preamble sequence and that the preset PRACH includes two consecutive preset 10 ms radio frames are used as an example in this embodiment of the present invention. Corresponding to another preset PRACH provided in this embodiment of the present invention, if the quantity of repetition times of the preamble sequence sent by the user equipment to the base station is two, the first sending unit 42 is specifically configured to separately send, in subframe 9 of a first frame and subframe 1 of a second frame, the preamble sequence once to the base station.

Alternatively, if the quantity of repetition times of the preamble sequence sent by the user equipment to the base station is four, the first sending unit 42 is specifically configured to separately send, in subframe 1 of a first frame, subframe 3 of the first frame, subframe 5 of the first frame, and subframe 7 of the first frame, the preamble sequence once to the base station; or the first sending unit 42 separately sends, in subframe 3 of a second frame, subframe 5 of the second frame, subframe 7 of the second frame, and subframe 9 of the second frame, the preamble sequence once to the base station.

It should be noted that the foregoing schematic structural diagrams of the preset PRACH are only for exemplary illustration of this embodiment of the present invention. A person of ordinary skill in the art may understand that the preset PRACH provided in the present invention, that is, the preset resource location of the preset PRACH provided in the present invention may be adaptively adjusted according to an actual requirement, and is not limited in the present invention.

This embodiment of the present invention further provides another implementation manner of the user equipment, where the implementation manner includes that: the first sending unit 42 is configured to after sending, at the n preset resource locations of the preset PRACH, the preamble sequence to the base station, if no response message is received by the first receiving unit 40 from the base station, send, at p preset resource locations of the preset PRACH, the preamble sequence to the base station, where p>n.

Corresponding to the another implementation manner of the user equipment provided in this embodiment of the present invention, the first sending unit 42 is configured to after separately sending, in subframe 1 of a first frame and subframe 5 of the first frame, the preamble sequence once to the base station, if no response message that is from the base station and is corresponding to the preamble sequence is received by the first receiving unit 40, separately send, in subframe 3 of a second frame, subframe 5 of the second frame, subframe 7 of the second frame, and subframe 9 of the second frame, the preamble sequence once to the base station.

According to the user equipment provided in this embodiment of the present invention, system information or a physical broadcast channel PBCH that is broadcast by a base station is acquired, where the system information or the PBCH includes a preset physical random access channel PRACH, the preset PRACH includes m preset radio frames, and m is a positive integer; it is determined that a quantity of repetition times of a preamble sequence, which is used for random access, at a preset resource location of the preset PRACH is n, where 1≤n≤10 m; and the preamble sequence is sent to the base station at n preset resource locations of the preset PRACH. By using this solution, the user equipment sends, at the n preset resource locations of the preset PRACH, the preamble sequence to the base station, that is, the quantity of repetition times of the preamble sequence sent by the user equipment to the base station increases; therefore, signal strength of the preamble sequence received by the base station is enhanced, so that the preamble sequence can be correctly matched, thereby increasing a matching probability of the base station and increasing efficiency of gaining access to a cell by the user equipment.

Figure 14:
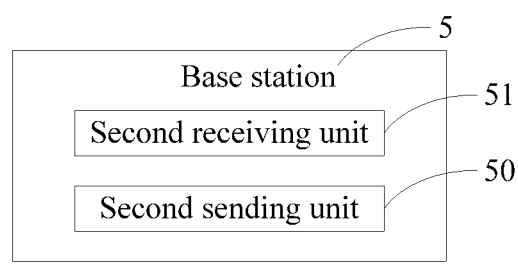
FIG. 14 is schematic structural diagram 1 of a base station according to an embodiment of the present invention.

As shown in FIG. 14, this embodiment of the present invention provides a base station 5, including: a second sending unit 50, configured to broadcast system information or a PBCH, where the system information or the PBCH includes a preset PRACH, the preset PRACH includes m preset radio frames, and m is a positive integer; and a second receiving unit 51, configured to receive, at n preset resource locations of the preset PRACH, k preamble sequences from user equipment, where the k preamble sequences are sent at the n preset resource locations of the preset PRACH after the user equipment determines that a quantity of repetition times of the preamble sequence, which is used for random access, at a preset resource location of the preset PRACH is n, where 1≤n≤10 m, and k≤n.

Further, the second sending unit 50 is further configured to send a downlink reference signal, so that the user equipment determines, according to the received downlink reference signal, that the quantity of repetition times of the preamble sequence at the preset resource location of the preset PRACH is n.

Further, the second receiving unit 51 is specifically configured to receive, at the n preset resource locations of the m preset radio frames in the preset PRACH, the k preamble sequences from the user equipment.

Further, the second receiving unit 51 is specifically configured to receive, within n preset subframes of the m preset radio frames in the preset PRACH, the k preamble sequences from the user equipment.

Figure 15:
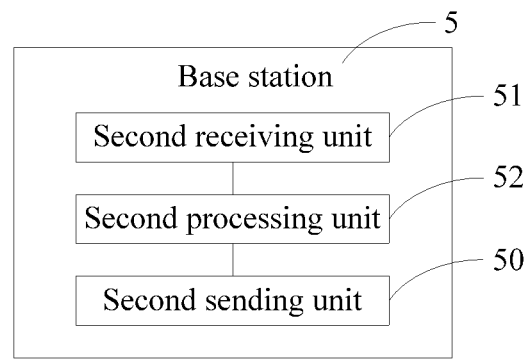
FIG. 15 is schematic structural diagram 2 of a base station according to an embodiment of the present invention.

As shown in FIG. 15, the base station 5 provided in this embodiment of the present invention further includes: a second processing unit 52, configured to: add up signal strength of the k preamble sequences received by the second receiving unit 51, and perform comparison between added-up signal strength of the k preamble sequences and a preset strength threshold.

Further, the second sending unit 50 is further configured to: if the signal strength obtained by the second processing unit 52 by adding up the k received preamble sequences is greater than or equal to the preset strength threshold, return a response message corresponding to the k preamble sequences to the user equipment.

According to the base station provided in this embodiment of the present invention, system information or a PBCH is broadcast, where the system information or the PBCH includes a preset PRACH, the preset PRACH includes m preset radio frames, and m is a positive integer; k preamble sequences are received from user equipment at n preset resource locations of the preset PRACH, where the k preamble sequences are sent at the n preset resource locations of the preset PRACH after the user equipment determines that a quantity of repetition times of the preamble sequence, which is used for random access, at a preset resource location of the preset PRACH is n. By using this solution, the user equipment sends, at the n preset resource locations of the preset PRACH, the preamble sequence to the base station, that is, the quantity of repetition times of the preamble sequence sent by the user equipment to the base station increases; therefore, signal strength of the preamble sequence received by the base station is enhanced, so that the preamble sequence can be correctly matched, thereby increasing a matching probability of the base station and increasing efficiency of gaining access to a cell by the user equipment.

Embodiment 3

Figure 16:
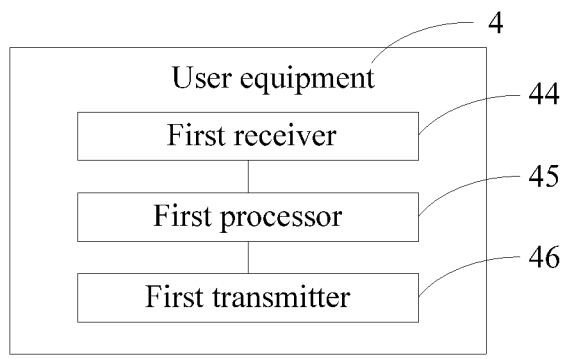
FIG. 16 is schematic structural diagram 2 of user equipment according to an embodiment of the present invention.

As shown in FIG. 16, this embodiment of the present invention provides user equipment 4, including: a first receiver 44, configured to acquire system information or a PBCH that is broadcast by a base station, where the system information or the PBCH includes a preset PRACH, the preset PRACH includes m preset radio frames, and m is a positive integer; a first processor 45, configured to determine that a quantity of repetition times of a preamble sequence, which is used for random access, at a preset resource location of the preset PRACH is n, where 1≤n≤10 m; and a first transmitter 46, configured to send, at n preset resource locations of the preset PRACH, the preamble sequence to the base station.

The first processor 45 is specifically configured to determine, according to the system information or the PBCH, that the quantity of repetition times of the preamble sequence at the preset resource location of the preset PRACH is n.

Alternatively, the first receiver 44 is specifically configured to receive a downlink reference signal sent by the base station, and the first processor 45 is specifically configured to determine, according to the downlink reference signal, that the quantity of repetition times of the preamble sequence at the preset resource location of the preset PRACH is n.

Alternatively, the first processor 45 is specifically configured to determine, according to a pre-formulated wireless communication protocol, that the quantity of repetition times of the preamble sequence at the preset resource location of the preset PRACH is n.

The first processor 45 is further configured to select, from multiple available preamble sequences according to the system information or the PBCH, one preamble sequence used for random access.

Further, the first transmitter 46 is specifically configured to send, at the n preset resource locations of the m preset radio frames in the preset PRACH, the preamble sequence to the base station.

Further, the first transmitter 46 is specifically configured to send, within n preset subframes of the m preset radio frames in the preset PRACH, the preamble sequence to the base station.

Referring to FIG. 8, a 1 ms preamble sequence and that the preset PRACH includes two consecutive preset 10 ms radio frames are used as an example in this embodiment of the present invention. Corresponding to the preset PRACH provided in this embodiment of the present invention, if the quantity of repetition times of the preamble sequence sent by the user equipment to the base station is two, the first transmitter 46 is specifically configured to: separately send, in subframe 1 of a first frame and subframe 5 of the first frame, the preamble sequence once to the base station; or separately send, in subframe 9 of a first frame and subframe 1 of a second frame, the preamble sequence once to the base station; or separately send, in subframe 5 of a second frame and subframe 9 of the second frame, the preamble sequence once to the base station.

Alternatively, if the quantity of repetition times of the preamble sequence sent by the user equipment to the base station is four, the first transmitter 46 is specifically configured to separately send, in subframe 3 of a first frame, subframe 7 of the first frame, subframe 3 of a second frame, and subframe 7 of the second frame, the preamble sequence once to the base station.

Referring to FIG. 9, a 1 ms preamble sequence and that the preset PRACH includes two consecutive preset 10 ms radio frames are used as an example in this embodiment of the present invention. Corresponding to another preset PRACH provided in this embodiment of the present invention, if the quantity of repetition times of the preamble sequence sent by the user equipment to the base station is two, the first transmitter 46 is specifically configured to separately send, in subframe 9 of a first frame and subframe 1 of a second frame, the preamble sequence once to the base station.

Alternatively, if the quantity of repetition times of the preamble sequence sent by the user equipment to the base station is four, the first transmitter 46 is specifically configured to: separately send, in subframe 1 of a first frame, subframe 3 of the first frame, subframe 5 of the first frame, and subframe 7 of the first frame, the preamble sequence once to the base station; or separately send, in subframe 3 of a second frame, subframe 5 of the second frame, subframe 7 of the second frame, and subframe 9 of the second frame, the preamble sequence once to the base station.

It should be noted that the foregoing schematic structural diagrams of the preset PRACH are only for exemplary illustration of this embodiment of the present invention. A person of ordinary skill in the art may understand that the preset PRACH provided in the present invention, that is, the preset resource location of the preset PRACH provided in the present invention may be adaptively adjusted according to an actual requirement, and is not limited in the present invention.

This embodiment of the present invention further provides another implementation manner of the user equipment, where the implementation manner includes that: the first transmitter 46 is configured to after sending, at the n preset resource locations of the preset PRACH, the preamble sequence to the base station, if no response message is received by the first receiver 44 from the base station, send, at p preset resource locations of the preset PRACH, the preamble sequence to the base station, where p>n.

Corresponding to the another implementation manner of the preamble sequence transmission method provided in this embodiment of the present invention, the first transmitter 46 is configured to after separately sending, in subframe 1 of a first frame and subframe 5 of the first frame, the preamble sequence once to the base station, if no response message that is from the base station and is corresponding to the preamble sequence is received by the first receiver 44, separately send, in subframe 3 of a second frame, subframe 5 of the second frame, subframe 7 of the second frame, and subframe 9 of the second frame, the preamble sequence once to the base station.

According to the user equipment provided in this embodiment of the present invention, system information or a physical broadcast channel PBCH that is broadcast by a base station is acquired, where the system information or the PBCH includes a preset physical random access channel PRACH, the preset PRACH includes m preset radio frames, and m is a positive integer; it is determined that a quantity of repetition times of a preamble sequence, which is used for random access, at a preset resource location of the preset PRACH is n, where 1≤n≤10 m; and the preamble sequence is sent to the base station at n preset resource locations of the preset PRACH. By using this solution, the user equipment sends, at the n preset resource locations of the preset PRACH, the preamble sequence to the base station, that is, the quantity of repetition times of the preamble sequence sent by the user equipment to the base station increases; therefore, signal strength of the preamble sequence received by the base station is enhanced, so that the preamble sequence can be correctly matched, thereby increasing a matching probability of the base station and increasing efficiency of gaining access to a cell by the user equipment.

Figure 17:
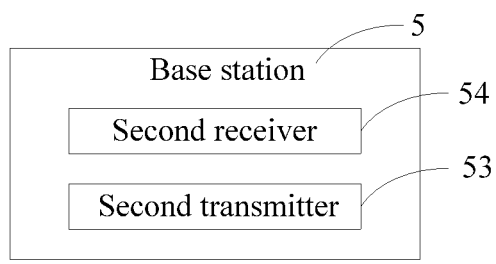
FIG. 17 is schematic structural diagram 3 of a base station according to an embodiment of the present invention.

As shown in FIG. 17, this embodiment of the present invention provides a base station 5, including: a second transmitter 53, configured to broadcast system information or a PBCH, where the system information or the PBCH includes a preset PRACH, the preset PRACH includes m preset radio frames, and m is a positive integer; and a second receiver 54, configured to receive, at n preset resource locations of the preset PRACH, k preamble sequences from user equipment, where the k preamble sequences are sent at the n preset resource locations of the preset PRACH after the user equipment determines that a quantity of repetition times of the preamble sequence, which is used for random access, at a preset resource location of the preset PRACH is n, where 1≤n≤10 m, and k≤n.

Further, the second transmitter 53 is further configured to send a downlink reference signal, so that the user equipment determines, according to the received downlink reference signal, that the quantity of repetition times of the preamble sequence at the preset resource location of the preset PRACH is n.

Further, the second receiver 54 is specifically configured to receive, at the n preset resource locations of the m preset radio frames in the preset PRACH, the k preamble sequences from the user equipment.

Further, the second receiver 54 is specifically configured to receive, within n preset subframes of the m preset radio frames in the preset PRACH, the k preamble sequences from the user equipment.

Figure 18:
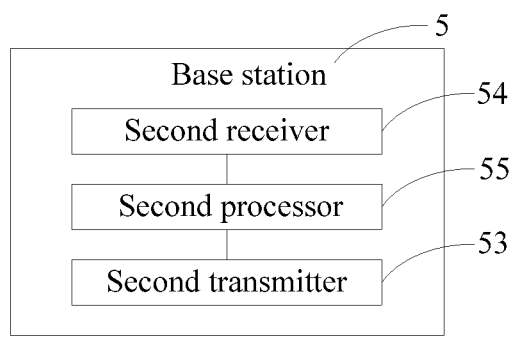
FIG. 18 is schematic structural diagram 4 of a base station according to an embodiment of the present invention.

As shown in FIG. 18, the base station 5 provided in this embodiment of the present invention further includes: a second processor 55, configured to: add up signal strength of the k preamble sequences received by the second receiver 54, and perform comparison between added-up signal strength of the k preamble sequences and a preset strength threshold.

Further, the second transmitter 53 is further configured to: if the signal strength obtained by the second processor 55 by adding up the k received preamble sequences is greater than or equal to the preset strength threshold, return a response message corresponding to the k preamble sequences to the user equipment.

According to the base station provided in this embodiment of the present invention, system information or a PBCH is broadcast, where the system information or the PBCH includes a preset PRACH, the preset PRACH includes m preset radio frames, and m is a positive integer; k preamble sequences are received from user equipment at n preset resource locations of the preset PRACH, where the k preamble sequences are sent at the n preset resource locations of the preset PRACH after the user equipment determines that a quantity of repetition times of the preamble sequence, which is used for random access, at a preset resource location of the preset PRACH is n. By using this solution, the user equipment sends, at the n preset resource locations of the preset PRACH, the preamble sequence to the base station, that is, the quantity of repetition times of the preamble sequence sent by the user equipment to the base station increases; therefore, signal strength of the preamble sequence received by the base station is enhanced, so that the preamble sequence can be correctly matched, thereby increasing a matching probability of the base station and increasing efficiency of gaining access to a cell by the user equipment.

Figure 19:
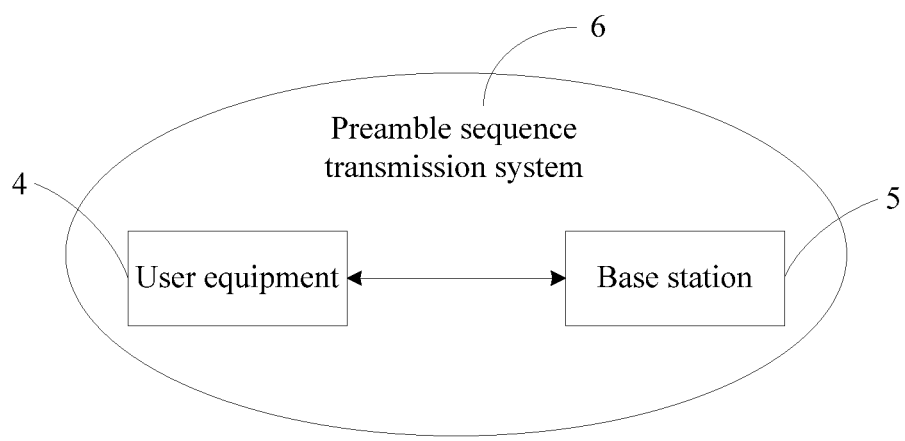
FIG. 19 is a block diagram of a preamble sequence transmission system according to an embodiment of the present invention.

As shown in FIG. 19, this embodiment of the present invention provides a preamble sequence transmission system 6, including: any user equipment 4 and any base station 5 that are described above.

According to the preamble sequence transmission system provided in this embodiment of the present invention, user equipment acquires system information or a PBCH that is broadcast by a base station, where the system information or the PBCH includes a preset PRACH and multiple preamble sequences, the preset PRACH includes m preset radio frames, and m is a positive integer; the user equipment determines that a quantity of repetition times of a preamble sequence, which is used for random access, at a preset resource location of the preset PRACH is n, where 1≤n≤10 m; and the user equipment sends, at n preset resource locations of the preset PRACH, the preamble sequence to the base station, so that the base station returns, after adding up and performing matching for k received preamble sequences, a response message corresponding to the k preamble sequences. By using this solution, the user equipment sends, at the n preset resource locations of the preset PRACH, the preamble sequence to the base station, that is, the quantity of repetition times of the preamble sequence sent by the user equipment to the base station increases; therefore, signal strength of the preamble sequence received by the base station is enhanced, so that the preamble sequence can be correctly matched, thereby increasing a matching probability of the base station and increasing efficiency of gaining access to a cell by the user equipment.

The solutions in the present invention can be described in the general context of executable computer instructions executed by a computer, for example, a program unit. Generally, the program unit includes a routine, program, object, component, data structure, and the like for executing a particular task or implementing a particular abstract data type. The solutions in the present invention may also be practiced in distributed computing environments in which tasks are performed by remote processing devices that are connected by using a communications network. In a distributed computing environment, program units may be located in both local and remote computer storage media including storage devices.

The embodiments in this specification are all described in a progressive manner, for same or similar parts in the embodiments, mutual reference may be made, and each embodiment focuses on a difference from other embodiments. Especially, an apparatus embodiment is basically similar to a method embodiment, and therefore is described briefly; for related parts, refer to the part of description in the method embodiment. The described apparatus embodiments are merely exemplary. The units described as separate parts may or may not be physically separate, and parts displayed as units may or may not be physical units and may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

A person of ordinary skill in the art may be aware that the exemplary units and algorithm steps described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Based on the description of the foregoing implementation manners, a person skilled in the art may clearly understand that the present invention may be implemented by software in addition to necessary universal hardware, where the universal hardware includes a universal integrated circuit, a universal CPU, a universal memory, a universal component, and the like; or may be implemented by dedicated hardware, where the dedicated hardware includes a dedicated integrated circuit, a dedicated CPU, a dedicated memory, a dedicated component, and the like. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:

acquiring system information that is broadcast by a base station, wherein the system information comprises configuration information of a preset physical random access channel (PRACH) that comprises m preset radio frames and a number of repetition times of a preamble sequence, which is used for random access, wherein m is a positive integer; and sending the preamble sequence to the base station, the preamble sequence being sent at n preset resource locations of the preset PRACH, wherein the preamble sequence is a format of 1 ms, or a format of 2 ms, or a format of 3 ms, and $1 < n \leq 10\ m$;

wherein, after sending the preamble sequence, and when no response message is received from the base station, the method further comprises re-sending the preamble sequence to the base station, the preamble sequence being re-sent at p preset resource locations of the preset PRACH, wherein p>n.

2. The method according to claim 1, wherein sending the preamble sequence to the base station comprises sending, within n preset subframes of the m preset radio frames in the preset PRACH, the preamble sequence to the base station.

3. The method according to claim 1, wherein sending the preamble sequence to the base station, the preamble sequence being sent at n preset resource locations of the preset PRACH, comprises:

sending a sequence formed after concatenation which is performed on n preamble sequences to the base station, wherein each concatenated preamble sequence consists of a cyclic prefix (CP), a preamble and a protection time.

4. A user equipment, comprising:

a receiver, configured to receive system information that is broadcast by a base station, wherein the system information comprises configuration information of a preset physical random access channel (PRACH) that comprises m preset radio frames and a number of repetition times of a preamble sequence-n, which is used for random access, m being a positive integer; and a transmitter, configured to:

transmit, at n preset resource locations of the preset PRACH, the preamble sequence to the base station, wherein the preamble sequence is a format of 1 ms, or a format of 2 ms, or a format of 3 ms, and wherein $1 < n \geq 10\ m$; and after transmitting, at the n preset resource locations of the preset PRACH, the preamble sequence to the base station, and when no response message is received by the receiver from the base station, re-transmit, at p preset resource locations of the preset PRACH, the preamble sequence to the base station, wherein p>n.

5. The user equipment according to claim 4, wherein the transmitter is configured to transmit, within n preset subframes of the m preset radio frames in the preset PRACH, the preamble sequence to the base station.

6. The user equipment according to claim 4, wherein the transmitter is further configure to:

transmit a sequence formed after concatenation which is performed on n preamble sequences to the base station, wherein each concatenated preamble sequence consists of a cyclic prefix (CP), a preamble and a protection time.

7. A non-transitory computer-readable storage medium comprising instructions which, when executed by a computer in a user equipment, causes the user equipment to:

acquire system information that is broadcast by a base station, wherein the system information comprises configuration information of a preset physical random access channel (PRACH) that comprises m preset radio frames and a number of repetition times of a preamble sequence, which is used for random access, wherein m is a positive integer; and sending the preamble sequence to the base station, the preamble sequence being sent at n preset resource locations of the preset PRACH, wherein the preamble sequence is a format of 1 ms, or a format of 2 ms, or a format of 3 ms, and wherein $1 < n \leq 10\ m$;

after sending the preamble sequence to the base station at the n preset resource locations of the preset PRACH, and when no response message is received from the base station, re-sending the preamble sequence to the base station, the preamble sequence being re-sent at p preset resource locations of the preset PRACH, wherein p>n.

8. The medium according to claim 7, wherein sending the preamble sequence to the base station comprises sending, within n preset subframes of the m preset radio frames in the preset PRACH, the preamble sequence to the base station.

9. The medium according to claim 7, wherein sending the preamble sequence to the base station, the preamble sequence being sent at n preset resource locations of the preset PRACH, comprises:

sending a sequence formed after concatenation which is performed on n preamble sequences to the base station, wherein each concatenated preamble sequence consists of a cyclic prefix (CP), a preamble and a protection time.

* * * * *

UNITED STATES PATENT AND TRADEMARK OFFICE
CERTIFICATE OF CORRECTION

PATENT NO. : 10,257,808 B2
APPLICATION NO. : 15/712792
DATED : April 9, 2019
INVENTOR(S) : Xia et al.

Page 1 of 1

It is certified that error appears in the above-identified patent and that said Letters Patent is hereby corrected as shown below:

In the Claims

In Column 23, Line 43, Claim 4, delete "sequence-n," and insert --sequence,--.

In Column 23, Line 50, Claim 4, delete "$1 < n \geq 10$ m;" and insert --$1 < n \leq 10m$;--.

Signed and Sealed this
Second Day of July, 2019

Andrei Iancu
*Director of the United States Patent and Trademark Office*